F. A. FROMMANN.
VEHICLE WHEEL.
APPLICATION FILED MAR. 10, 1913.
1,208,940.
Patented Dec. 19, 1916.
2 SHEETS—SHEET 1.
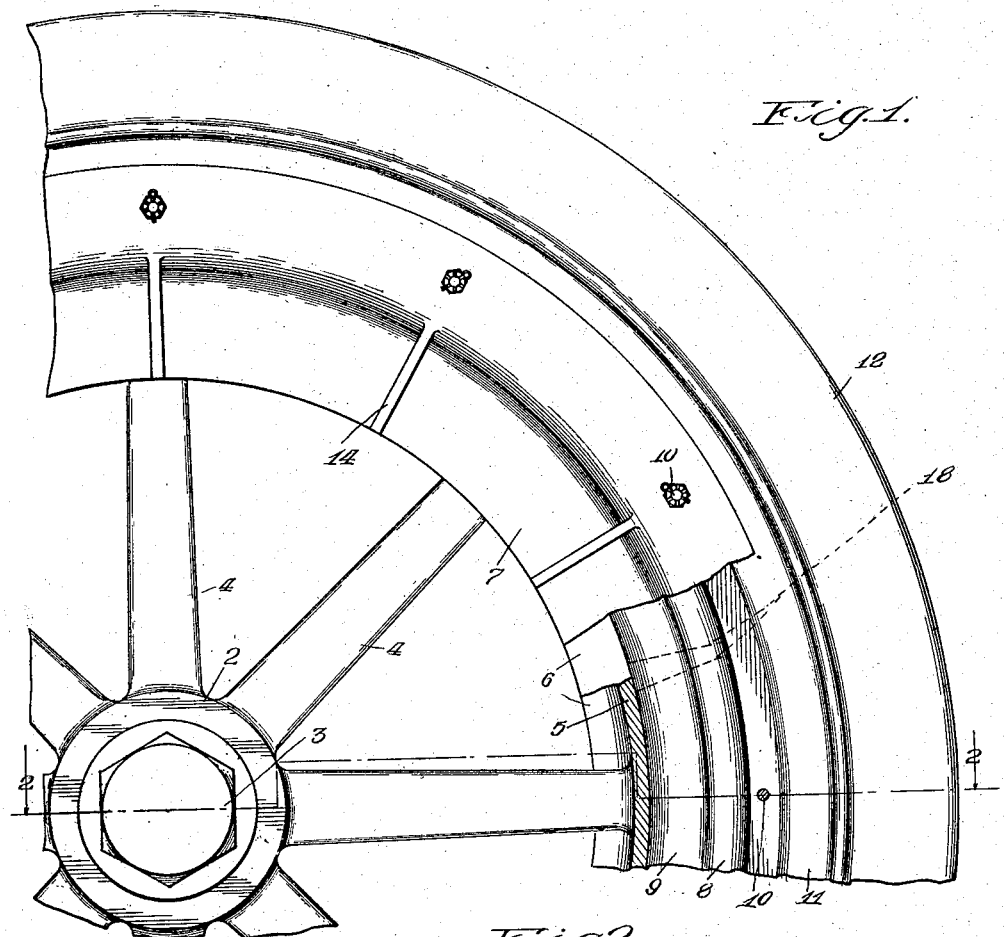
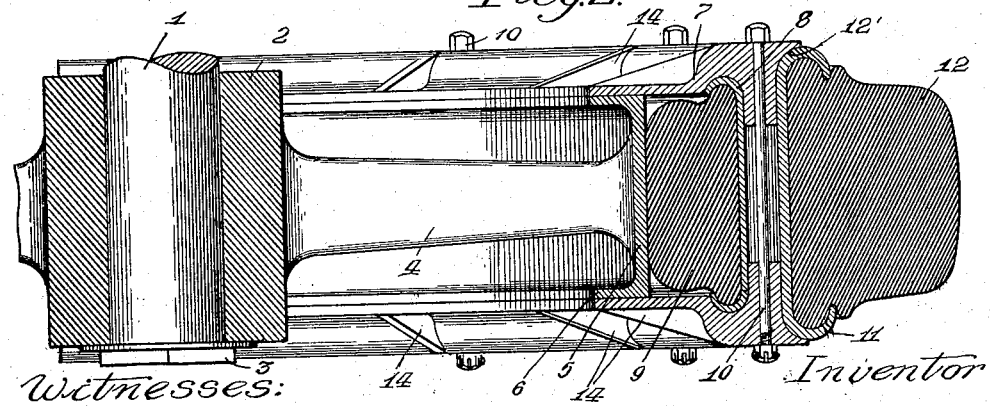

F. A. FROMMANN.
VEHICLE WHEEL.
APPLICATION FILED MAR. 10, 1913.
1,208,940.
Patented Dec. 19, 1916.
2 SHEETS—SHEET 2.
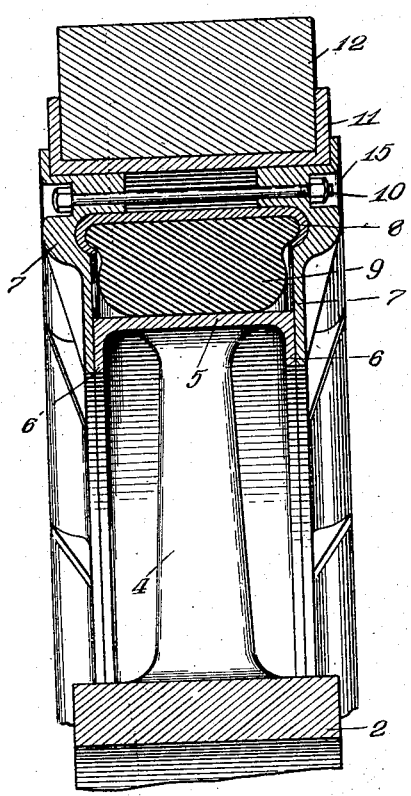
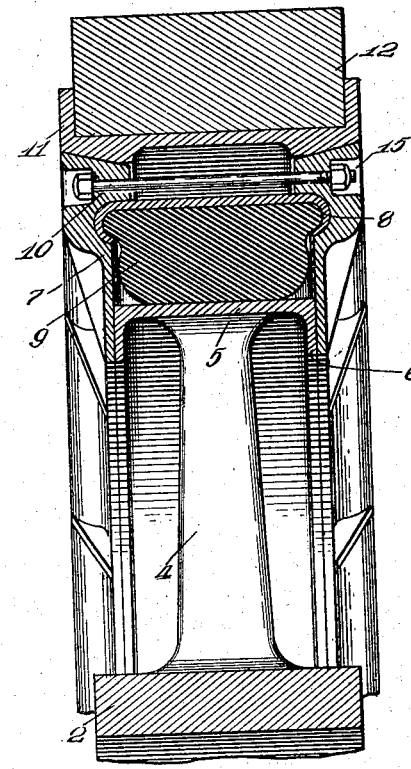
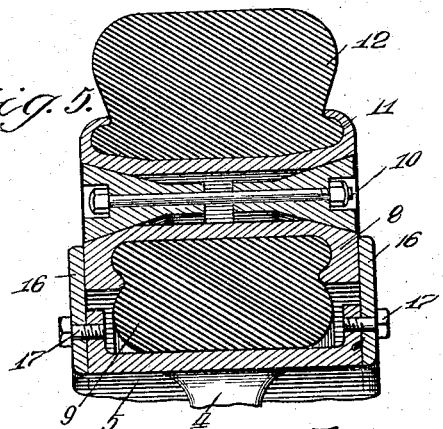
Witnesses:
Inventor
Franklin A. Frommann
By
Lotz + Scheibh Attys.

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,208,940.  Specification of Letters Patent.  Patented Dec. 19, 1916.

Application filed March 10, 1913. Serial No. 753,321.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels of the class having part or all of the resiliency of the wheel provided by a cushioning member or members positioned interiorly of the tire formation of the wheel.

In my copending applications Serial Nos. 740,460, 740,459 and 735,722, I have shown and described wheels of this class, each equipped with a tire member floatingly mounted with respect to the hub and to an inner rim carried by the hub, the said rim carrying one or more annularly disposed cushioning members bearing outwardly against the floatingly carried tire member of the wheel.

My present invention relates to a wheel construction in which the interposed cushioning member is carried by the tire formation of the wheel and has centripetal bearing against, and frictional contact with, the inner rim of the wheel.

One object of my invention is to provide a wheel construction of this class which will permit the interiorly positioned cushioning member or members to be mounted upon the tire member of the wheel.

Another object is to provide a simple, strong and well braced rim construction which will simultaneously secure the tread formation of the tire and the interior cushioning members to the other separable portions of the tire member of the wheel.

Still further objects are to provide means for wedgingly interlocking the various portions of the tire formation simultaneously, and for housing the interior cushioning members so as to protect them from the action of mud, snow, stones or sand which might otherwise enter the part of the wheel in which the cushioning member is mounted.

The wheel construction of my invention is equally applicable to wheels having tread formations of wood or other comparatively non-resilient materials, and to wheels having an outer tire rim of vulcanized rubber or other resilient material adapted to supplement the cushioning action of the interiorly positioned member or members, and is shown in both applications in the accompanying drawings.

In the drawings:—Figure —1— is a fragmentary side elevation of a wheel embodying my invention, portions of the wheel being broken away to disclose other portions thereof. Fig. —2— is a section through Fig. —1— along the line 2—2. Figs. —3—, —4—, and —5—, are fragmentary sections through alternative embodiments of my invention.

In the embodiment of Fig. —1—, the wheel comprises a hub 2 mounted upon a shaft 1 and held thereon by a nut 3, the hub having integral therewith a plurality of spokes 4 terminating in a cylindrical rim 5. At each side of the wheel, the rim 5 has annular flanges 6 extending radially inward of the wheel along planes at right angles to the axis of the shaft 1 of the wheel.
Bearing laterally against the said flanges 6 at opposite sides of the wheel and extending radially outward beyond the periphery of the cylindrical rim 5 are annular side flanges 7 having upon their inner surfaces opposed annular grooved formations facing each other, these formations corresponding to the opposed and outwardly directed annular formations of a cushion-tire-holding rim 8, the latter being preferably of steel. Radially inward of the said tire-holding rim 8, I position an annular cushioning member 9, the latter having laterally projecting flanges corresponding to inwardly facing groove formations upon the tire-clenching rim 8, and being forced into the said rim after the manner familiar to users of rubber cushioning tires. Radially outward of the annular formations engaging the cushion-holding rim 8, the side flanges 7 are provided with a plurality of transverse perforations adapted to receive bolts 10 extending transversely through both flanges and adapted to draw the same into interlocking or clamping engagement with the cushion-holding rim 8 and simultaneously into frictionally sliding contact with the lateral flanges 6 of the inner rim of the wheel. Radially outward of the said perforations, the side flanges have substantially cylindrical end formations adapted to form part of the seat for an outwardly directed tire-clenching rim 11, into which an exterior cushioning tire 12 is adapted to be inserted, and also having adjacent to its lateral edges outwardly directed wedging formations 12 adapted to engage the tire-holding rim 11 adjacent to its lateral edges. By suitably designing the shapes of the said flanges 12, the side flanges 7 when drawn toward each other by the bolts 10 will simultaneously grip both the clenching rim 8 carrying the inner cushioning member and the outer clenching rim 11 having the cushion tire 12 mounted thereon, and will bear lightly against the flanges 6 of the inner rim so as to hold the tire member of the wheel in lateral alinement with the hub and spoke formation. To prevent the bolts 10 from flexing the side flanges 7 out of their normal shape, I preferably provide stiffening ribs 14 extending outward from the inner edge of the side flanges to the perforated portion thereof, as shown in Figs. —1— and —2—.

Instead of having the outer tire rim 11 equipped for holding a rubber tire having laterally projecting flanges, as in Fig. —2—, the said rim may be adapted for receiving tread blocks of wood, as in Figs. —3— and —4—. Likewise, instead of having the bolt-heads and the nuts of the bolts 10 projecting beyond the lateral edges of the side flanges 7, these said flanges may be provided with recesses 15 adapted to house the said heads and nuts, as in Figs. —3— and —4—.

Instead of equipping the side flanges 7 with circumferential formations 12 adapted to engage the lateral edges of the tire-holding member 11, these said flanges may terminate in formations adapted only to force the said member 11 outwardly by a wedging action, as in Fig. —4—. Or, the wedging action may be produced by annular flanges drawn into simultaneous wedging engagement both with the ring carrying the outer tread formation and with the ring carrying the inner cushioning formation, as in Fig. —5—, in which case the side flanges may be shortened radially into annular plates 16 secured to the inner rim 6 of the tire by bolts 17.

While I have spoken of the inner cushioning element 9 as a single member, I do not wish to be limited to this arrangement, as the interior resiliency of the wheel might be provided by a series of cushioning members disposed in annular formation and separated by radial spaces 18, as shown in Fig. —1—. Having previously described and claimed the use of a floatingly mounted tire member of a wheel in connection with side flanges extending radially inward of the same and laterally guiding the same with respect to the hub member of the wheel, I do not claim this as new in itself, but only in combination with the other elements as herein disclosed. It will be evident from Figs. —2—, —3—, —4— and —5—, that my present invention not only provides a simple method of mounting the cushioning member within the wheel, but also entirely incases this so as to prevent sand and stones from entering this portion of the wheel and causing undue wear upon the inner cushioning member. While I have shown this inner cushioning member in a form having laterally projecting flanges coacting with corresponding formations upon the tire member of the wheel for holding the same in operative position, I do not wish to be limited to this particular design or construction, nor to other details of the construction which might be modified in many ways without departing from the spirit of my invention.

I claim as my invention:

In a vehicle wheel, a hub member, a rim rigid therewith, equipped with parallel radial side flanges extending inwardly from its outer periphery, a clencher tire rim surrounding said rigid rim and movable with respect thereto, an annular cushion equipped at its outer periphery with a rigid clencher carrier and yieldingly supporting the clencher tire rim radially with respect to the rigid rim, a pair of opposite rigid side flanges each provided with a pair of circumferential grooves adapted to receive respective edges of said clencher rim and clencher carrier, and overlapping at their edges the side flanges of the rigid rim, and bolts extending between the clencher rim and clencher carrier and clamping said opposed side flanges rigidly upon same, said clencher rim and carrier serving to rigidly space said side flanges and prevent their inner edges binding upon the side flanges of the rigid rim.

In testimony whereof I have signed my name in presence of two subscribing witnesses.

FRANKLIN A. FROMMANN.

Witnesses:
 ALBERT SCHEIBLE,
 M. M. BOYLE.